Oct. 29, 1940.　　　C. E. QUICK　　　2,219,724
SORTING TABLE OR THE LIKE
Filed May 20, 1938　　　3 Sheets-Sheet 1
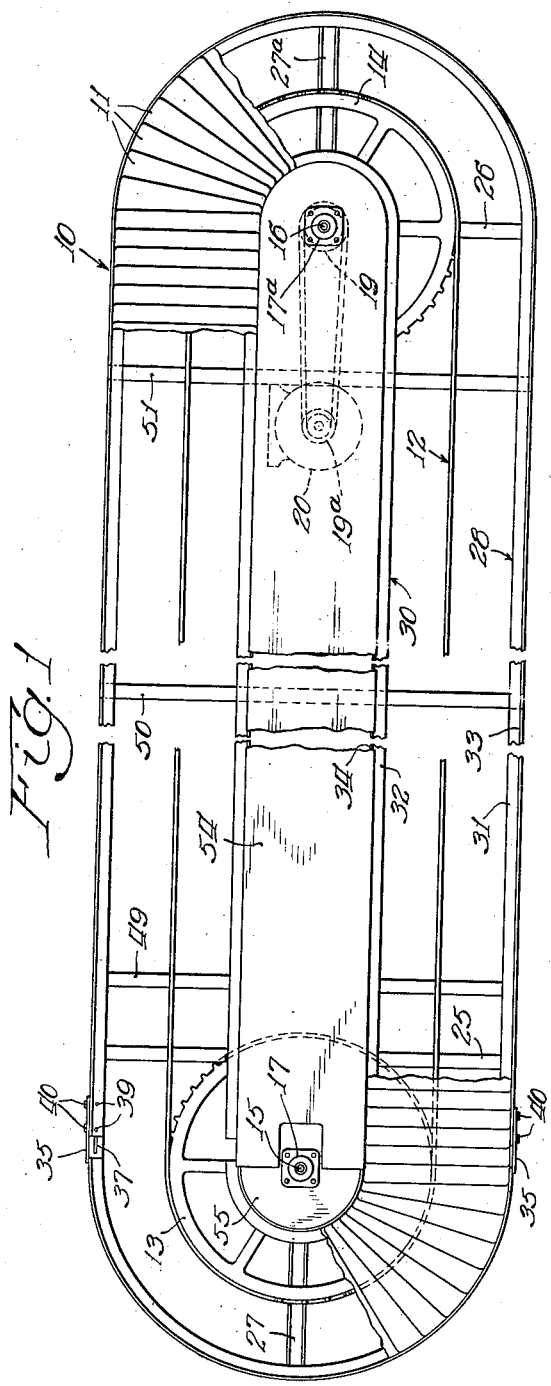
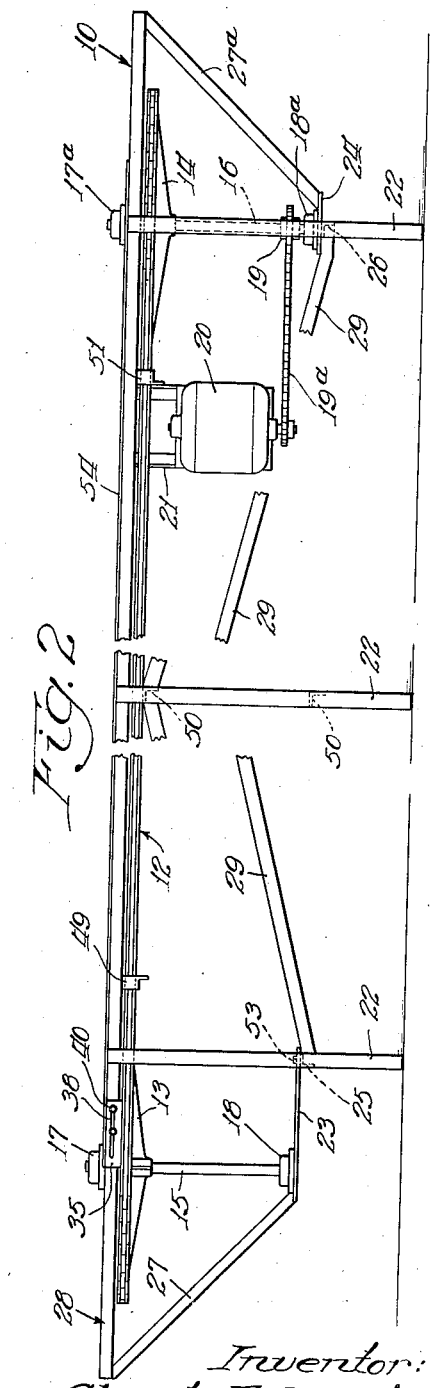
Inventor:
Claude E. Quick
By: A. Trevor Jones
Atty.

Oct. 29, 1940.  C. E. QUICK  2,219,724
SORTING TABLE OR THE LIKE
Filed May 20, 1938  3 Sheets-Sheet 2
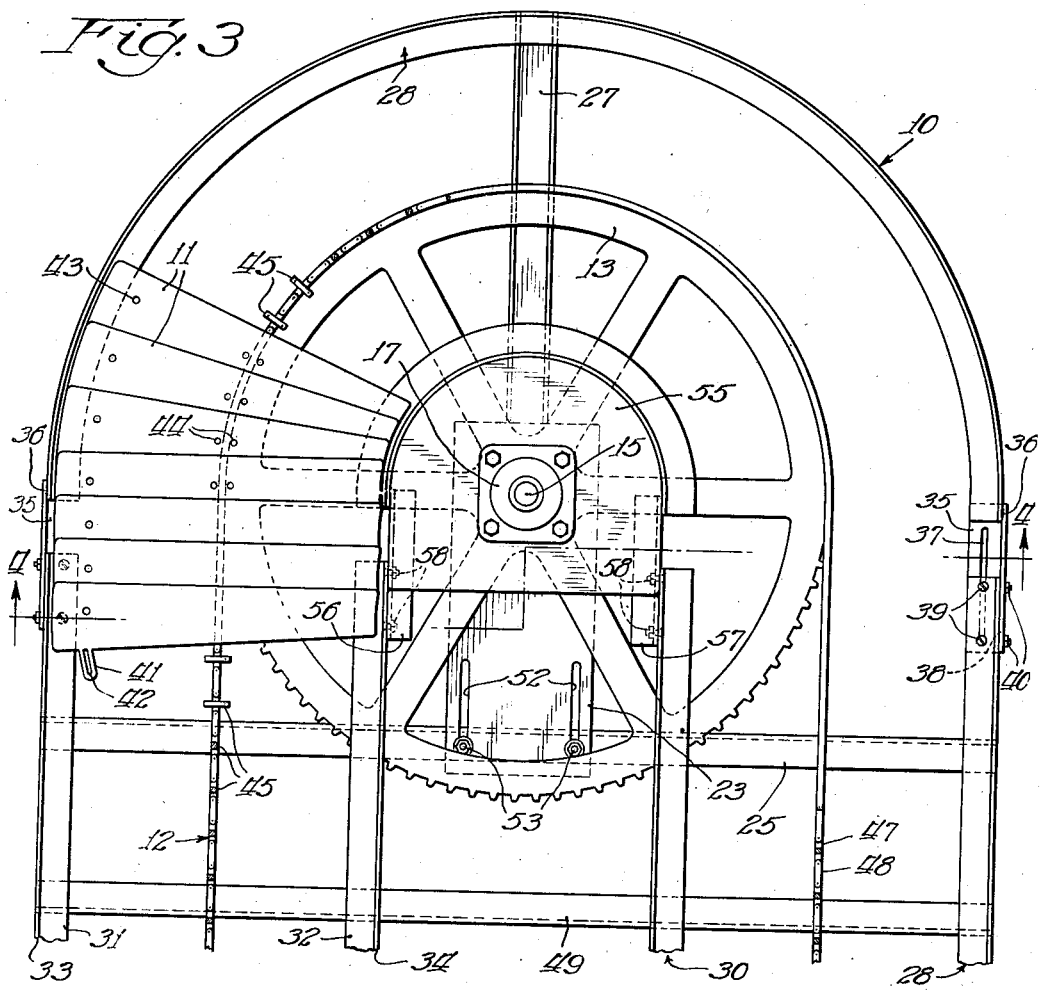
Inventor:
Claude E. Quick
By: A. Trevor Jones
Atty Oct. 29, 1940.    C. E. QUICK    2,219,724
SORTING TABLE OR THE LIKE
Filed May 20, 1938    3 Sheets-Sheet 3
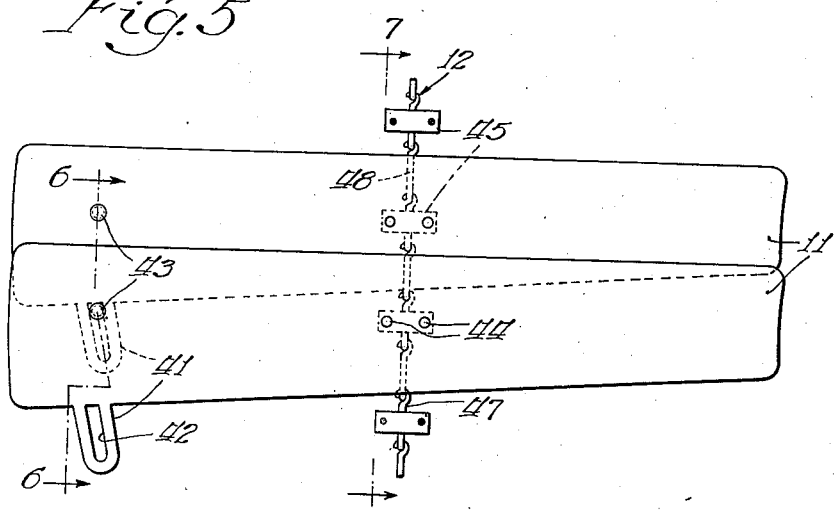
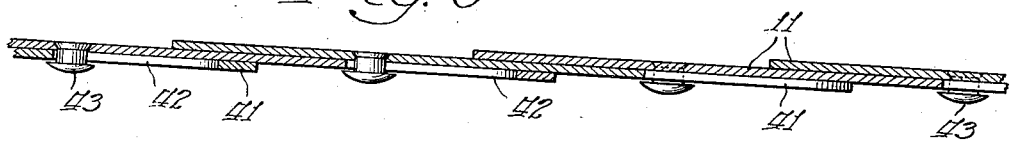
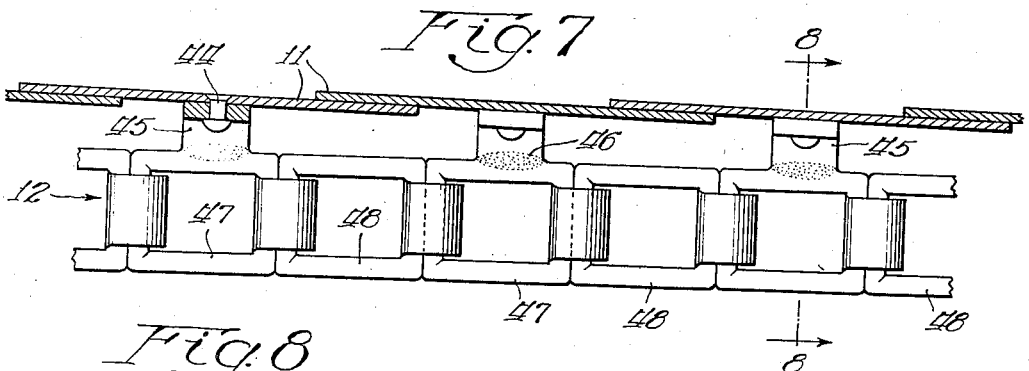
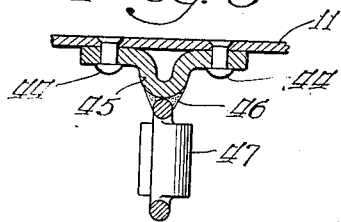
Inventor:
Claude E. Quick
By A. Trevor Jones
Atty.

Patented Oct. 29, 1940

2,219,724

UNITED STATES PATENT OFFICE 2,219,724

SORTING TABLE OR THE LIKE

Claude E. Quick, Glendale, Calif., assignor to Interstate Bakeries Corporation, Kansas City, Mo., a corporation of Delaware Application May 20, 1938, Serial No. 208,956

1 Claim. (Cl. 198—181)

This invention relates to a sorting table or the like of particular utility in bakeries for use in sorting cake goods or other somewhat fragile bakery products.

Among other objects, the invention aims to provide an improved and simplified device of this type. In one use of the device, the cakes after they have cooled sufficiently, are placed on the device which causes them to circulate so that the cakes are brought at intervals within convenient reach of one or more operators, who are usually young girl employees, seated at the side of the device. From there the cakes may be transferred to other apparatus for subsequent treatment, such as an icer, or even to a wrapping machine, in each case the device providing a surplus number of cakes always available to the operator.

Other objects and advantages will be readily apparent from the following description, taken together with the accompanying drawings, in which—

Figure 1 is a plan view of a table constructed in accordance with my invention; parts being broken away for convenience;

Figure 2 is a side elevational view of the structure of Fig. 1;

Figure 3 is an enlarged plan view of one end of the table, in this instance the left-hand end looking at Fig. 1;

Figure 4 is a cross-section taken on the line 4—4 of Fig. 3;

Figure 5 is an enlarged detail view of parts of the device;

Figure 6 is a partial enlarged section taken on the line 6—6 of Fig. 5;

Figure 7 is a partial enlarged section taken on the line 7—7 of Fig. 5; and

Figure 8 is a cross-section taken on the line 8—8 of Fig. 7.

Referring in detail to the drawings, the table 10 is in somewhat oval form, the top of which provides an endless track in a horizontal plane for a conveyor comprising a series of slats 11 connected to a chain 12. The chain is entrained on sprocket wheels 13 and 14 mounted on axles 15 and 16 respectively, having bearings in bearing blocks 17 and 18, for the axle 15, and 17a and 18a for the axle 16 at each end of the table. On the axle 16 is also a sprocket wheel 19 with which meshes a driving chain 19a energized by the electric motor 20 dependently supported by the table 10 as on the bracket 21. Standards 22 raise the table to a suitable height from the floor for the track itself such as would be convenient to a person of average height. The lower bearing blocks 18 and 18a are supported by brackets 23 and 24 respectively which are carried on struts 25 and 26 respectively transversely connecting a pair of legs 22. Brace bars 27 and 27a further support the brackets 23 and 24 respectively as by being connected thereto and to the outer track angle member 28. Interior brace bars 29 also give the table strength and rigidity.

The track itself is formed of the outer angle member 28 and the inner angle member 30. The horizontal flanges 31 and 32 jointly provide a horizontal sliding support for the slats 11 in their travel along the track. The vertical portions 33 and 34 respectively of the angle members 28 and 30 serve as guides for the slats. The angle members 28 and 30 are longitudinally sectioned so as to provide curves, in this instance one-hundred eighty degree curves at each end of the table, and tangents, or intermediate straight sections, these sections being joined together by angle member 35 which may be welded as at 36 to a curved section 28 and may be slotted as at 37 and 38 to have passed therethrough clamping bolts 39 and 40, by which the length of the table may be adjusted to tighten the chain 12 and to take up for wear, for example, in the chain.

The slats 11 are desirably non-rectangular, preferably of trapezium shape as best shown in Fig. 5, and are partially overlapping as best shown in Figs. 5, 6 and 7. The slats are thus wider at their outer ends, that is, adjacent the outer track member 28 than they are at their inner ends adjacent the inner track member 30, so that as the slats are carried along the track by the chain 12, and come to a curve, the slats can spread out fan-wise at their outer ends without leaving a gap therebetween. To limit this fan-wise movement of the slats, each slat desirably has an extension 41 which is slotted as at 42 to slidingly receive therethrough a rivet 43 on an adjacent slat.

As here shown, each slat has riveted thereto as best shown in Fig. 8, as by rivets 44, a depending lug 45 to which is welded as at 46 a chain link 47, other intermediate adjacent links 48 between each of the chain links 47 and flexibly connected thereto jointly forming therewith the chain 12.

Thus, when driven by the motor 20 as already described, the endless conveyor formed by the slats 11 will carry an article or a series of articles continuously around the table 10 until the article is picked up by the operator for subsequent treatment.

Intermedially of the sprocket wheels 13 and 14 respectively, the chain 12 is desirably slidably supported by cross bars 49, 50 and 51.

At least one of the bearing brackets, in this instance the bracket 23, is slotted at one end as at 52 by a pair of parallel slots to receive clamping bolts 53 which adjustably clamp the bracket to the strut 25, thus allowing for extension of the table as already described, by means of the slotted extension track member 35.

The bearing blocks 17, 18, 17a and 18a may advantageously be of the usual anti-friction type not necessary to be here discussed in detail, and are supported directly by plates 55 which are carried on the inverted angle members 56 and 57 bolted as at 58 to the track angle members 30. The adjustment of members 56 and 57 to the track members 30 is also longitudinally in the same manner as and to compensate for adjustment of the track extension members 35.

The central part of the table may be closed by a cover member 54 which also conveniently provides a stationary deposit place for storage of broken or burned cakes.

It has been found that no lubrication is necessary for the slats, as crumbs and grease from the products which find their way between the slats act as sufficient lubrication, and the slats and center part 54 are desirably made of stainless steel, so as to be easily kept clean.

Such changes may be made as fall within the scope of the following claim without departing from the invention.

Having described my invention, I claim:

A sorting table or the like embodying an endless conveyor including a series of slats of trapezium form partially overlapping one upon another, the slats being wider at their margins adjacent the outer side of the track than at the inner side of the track, an extension on each slat near its outer end extending beneath an adjacent slat and slotted somewhat in the direction of travel of the slats, said slotted extension receiving a rivet-like member on an adjacent slat to limit relative movement of the slats, an endless track for the slats comprising curves and tangents in a horizontal plane, and means for causing said slats to travel along said track while permitting said relative movement of the slats in their common movement about said curves.

CLAUDE E. QUICK.